United States Patent

Erlich

[15] 3,640,310
[45] Feb. 8, 1972

[54] MULTIPORT VALVE

[72] Inventor: Giora Erlich, North Bergen, N.J.

[73] Assignee: Hayward Manufacturing Company, Inc., Elizabeth, N.J.

[22] Filed: June 26, 1969

[21] Appl. No.: 836,795

[52] U.S. Cl..........................137/625.46, 210/169, 210/411, 251/317
[51] Int. Cl.............................................F16k 7/16
[58] Field of Search....................210/169, 425, 429, 411, 95; 251/314, 316, 317; 137/625.15, 625.18, 625.46, 625.17

[56] References Cited

UNITED STATES PATENTS

| | | | |
|---|---|---|---|
| 3,184,213 | 5/1965 | Anderson | 251/316 X |
| 3,296,026 | 1/1967 | Long | 251/317 X |
| 3,513,981 | 5/1970 | Mendelow | 137/625.15 X |

FOREIGN PATENTS OR APPLICATIONS

| | | | |
|---|---|---|---|
| 707,249 | 4/1954 | Great Britain | 210/95 |

Primary Examiner—Reuben Friedman
Assistant Examiner—T. A. Granger
Attorney—Janes & Chapman

[57] ABSTRACT

A multiport valve is provided having a manually operated rotor for selectively directing the flow from an inlet port to a desired outlet port. A high-pressure inlet port is positioned upstream of the rotor so that the inlet pressure biases the rotor against the seat to prevent the leakage of fluid in the selected position. The valve seat is a unitary resilient seal which is disposed within a groove surrounding the entrance portion of each outlet port. The unitary seal effectively prevents leakage by utilizing a raised seating portion to seal against the rotor and a dovetail lower portion to seal against the sides of the groove.

11 Claims, 8 Drawing Figures

MULTIPORT VALVE

Multiport valves permit fluid from one or more influent lines to be directed to one or more preselected effluent lines. These valves perform the function of a switch to conduct or transfer flow from one line to another line, mix the flow from several sources and then conduct it to a preselected line, or simply stop the flow. Because they are capable of several functions, multiport valves are widely used for fluid-transporting systems in such areas as the chemical process industry, water treatment facilities, and swimming pool water circulation systems.

Many multiport valves comprise a lower housing portion having connecting means for both the influent and effluent lines, and internal flow passages for conducting the flow within the valve to the valve seat, an upper housing portion connected to the lower housing portion at a position adjacent to the valve seat, and a valve rotor disposed within the upper housing portion to seal against the valve seat and selectively direct the flow from an influent line to an effluent line. The rotor is usually a disc having openings which correspond to influent and effluent lines and which can be selectively aligned to match the desired flow passages in the lower housing portion. The position of the rotor upon the seat above the flow passages in the lower housing portion determines the direction that the flow will take.

The rotor is movably disposed within the upper housing portion, so that it may be lifted from the valve seat and rotated to the desired position. An external lever mechanically linked to the rotor by means extending through the upper portion of the valve housing is usually provided for this purpose. The seat is usually a rubber gasket which is disposed between the rotor and the lower housing portion. The gasket can be in the form of a flat continuous sheet having a plurality of apertures therein which correspond to the flow passages in the lower housing portion, as utilized in the multiport valve of U.S. Pat. No. 2,857,929 to Whitlock, Jr., or there can be individual gaskets which surround each flow passage, such as shown in U.S. Pat. No. 2,633,325 to Whitlock, Jr. A spring is provided to bias the rotor against the rubber gasket, thus sealing the valve in the selected position.

Multiport valves of this type have several deficiencies which have adverse effects upon their operation and upon the operation of the fluid system in which they are utilized. In these valves, the fluid both enters and leaves via flow passages located within the lower housing portion. Therefore, since the valve rotor is disposed within the upper housing portion, the fluid necessarily must pass through the rotor twice in its passage from the influent line to the selected effluent line; firstly, when the influent flow enters the upper housing portion via an opening in the rotor, and secondly, when it passes from the upper housing portion through the rotor to the selected effluent line. This causes the fluid to travel a tortuous path which can create a high differential pressure across the valve, and across the system wherein the valve is being utilized. When a high volume of fluid is being transported at a relatively low pressure, a high differential pressure resulting from the utilization of the multiport valve can create a serious problem by reducing the flow rate or overheating the pump.

The fluid entering the valve via the lower housing portion also exerts a force upon the rotor which tends to lift it from the seat. The magnitude of this lifting force is proportional to the differential pressure across the rotor. Only the force of the spring maintains the rotor in its sealing position upon the valve seat. Therefore, as the flow rate increases, there is a tendency for leakage to occur across the rotor and be discharged through unselected ports. This can be a serious problem where a flat gasket not capable of being greatly compressed is utilized between the rotor and the lower housing portion, inasmuch as slight lifting of the rotor could release the compression upon the gasket and break the seal. In addition to lifting the rotor from the seat, if the influent flow passes through an opening in the rotor which is offcenter as shown in U.S. Pat. No. 2,633,325 to Whitlock, Jr., a torque can be exerted upon the rotor which tends to twist it within the upper housing portion. The combined effect of the torque and the lifting of the rotor increases the probability of leakage. The individual gaskets utilized by Whitlock, Jr. in U.S. Pat. No. 2,633,325 have raised seating surfaces and thereby overcome in part the problem of twisting, by allowing additional compression of the seals surrounding the outlet flow passages and a reduction in compression of the seals surrounding the inlet flow passages without breaking the seal. This is an improvement over the utilization of a flat gasket; however, it does not prevent leakage where the entire rotor is lifted from the seat by the force of the fluid passing therethrough.

The gaskets utilized to provide the seal between the rotor and the valve housing are usually formed from a soft rubber composition, so that merely low force need be applied to cause compression. While this is advantageous to sealing, it is detrimental to the life of the gasket. Due to its softness, the gasket is quite susceptible to wear by abrasion and erosion which deteriorates the sealing surface and causes leakage. Abrasion can occur if the rotor is not properly lifted from the seat prior to its rotational movement to another position, and when hard particulate material, such as sand, suspended in the fluid passes between the rotor and the seat. Erosion is caused by the passage of extremely high velocity flow between the rotor and the seat.

Since the gaskets are susceptible to wear, they must be replaced at regular intervals. This can create another difficulty, inasmuch as it is often necessary to bond the gaskets to the lower housing portion, to prevent leakage between the housing and the gasket, and to prevent the gasket from being swept away by the flow when the rotor is lifted from the seat. In order to remove the gaskets for replacement, the bond must be broken, and the bonding agent removed to allow the installation of the new gaskets. This is a time-consuming and costly operation, which if not properly performed can cause damage to the multiport valve.

Because of the widespread use of multiport valves, attempts have been made in the prior art to correct the deficiencies discussed above. For example, in U.S. Pat. No. 2,582,333 to Horodeck, a multiport rotary valve is provided in which the influent line is connected to the upper housing portion of the valve upstream of the valve rotor, and all effluent lines are connected to the lower housing portion of the valve downstream of the valve rotor. This substantially eliminates the problem of high differential pressure associated with the passage of flow through the valve rotor. The influent flow enters the upper housing portion, passes once through the rotor, and flows directly to the effluent line.

However, the positioning of the influent line connection upstream of the valve rotor in the upper housing portion has created other problems in the Horodeck multiport valve. Servicing of the valve can only be accomplished by separating the upper and lower housing portions at their juncture point. Since the inlet port is located in the upper portion of the housing and the outlet ports are located in the lower portion of the housing, it necessarily follows that in order to separate the two housing portions the connections to either the inlet or the outlet ports must be removed. This increases the labor time and cost for servicing, and also can result in the loss of fluid that spills from the disconnected lines. In addition, reassembling the valve after servicing can be even more difficult. The two housing portions must be properly aligned so that a fluidtight seal between them can be made, and the rotor must be correctly positioned on the inside. This is particularly difficult when the flexing of the piping lines exerts a force upon the two housing potions that tends to maintain their separation, as is often the case in fluid piping systems. Multiport valves are usually constructed from a metallic material, such as steel and brass and are quite heavy and quite large, a factor which further makes such valves difficult and cumbersome to install and service.

Unlike other multiport rotary valves, the Horodeck valve is pilot operated. A fluid-operated device is provided to unseat the rotor so that it may be easily rotated. The unseating device comprises a pressure chamber located beneath the exterior of the lower portion of the valve body and a diaphragm disposed within the chamber which is operatively connected by means of a shaft extending through the valve body to the rotor. Inlet pressure is conducted to the pressure chamber so that the diaphragm will axially move the shaft and thereby unseat the rotor. The valve handle is linked to an actuating valve which permits inlet pressure to reach the pressure chamber in order to unseat the valve rotor. While it appears that the pressure of the influent flow exerts a force upon the rotor to bias it into a seating position and thus substantially eliminating the leakage problem heretofore discussed, it in fact does not completely eliminate the problem. Since the valve rotor is unseated by utilizing the inlet pressure, if the actuating valve and/or connecting line to the pressure chamber develops a leak, the inlet pressure will in fact always act upon the diaphragm, thereby tending to unseat the rotor.

In accordance with the present invention an improved multiport valve is provided which substantially eliminates the problems and deficiencies found in existing multiport valves. The multiport valve of the instant invention has a low differential pressure, maintains its seal under all flow conditions, and utilizes a seal ring for the rotor seat that is stronger and less susceptible to wear than prior seals. In addition, the multiport valve is lightweight and can be rapidly installed and serviced without disconnecting any fluid line connections.

The multiport valve of the invention comprises a unitary valve body having an open central portion, at least one high-pressure inlet port in direct fluid communication with the open central portion, and a plurality of low pressure inlet and outlet ports in fluid communication with the open central portion via an array of individual flow passages; a valve rotor having a plurality of openings and movably disposed within the open central portion of the valve body between the line of flow from the high-pressure to the low-pressure ports, and in close juxtaposition to the array of flow passages, for rotational and axial movement therein, to selectively communicate the high-pressure port with at least one flow passage leading to a low-pressure port, and to selectively interconnect at least two flow passages for flow between two low-pressure ports; and a hard, abrasion resistant, resilient unitary seal ring for sealing the rotor when seated in a selected position, disposed as a valve seat between the rotor and the valve body and surrounding each flow passage in the array to prevent leakage therebetween. A valve cover having a bore therethrough sealably engages the valve body to enclose the open central portion and prevent external leakage of fluid. A valve handle disposed on the exterior of the cover for the manual selection of a particular rotor position is operatively connected to the rotor through the bore in the valve cover.

The construction of the unitary valve body cures several deficiencies found in multiport valves. The rotor has a pressure surface which is acted upon by the high-pressure inlet flow and a seating surface which contacts the unitary seal ring. Since the rotor is disposed between the high- and low-pressure connecting ports, the differential pressure thereacross helps to bias the rotor against the seat to prevent leakage of fluid rather than lifting the rotor from the seat. All effluent lines are disposed in the valve body downstream from the valve seat, so that the fluid passing through the valve rotor from the high-pressure inlet port to any selected outlet port or ports flows only once through the valve rotor, thus maintaining a low differential pressure thereacross. Furthermore, since the unitary valve body contains all influent and effluent line connections, the multiport valve of this invention can be serviced without disconnecting any fluid line. Simply removing the cover provides access to the interior of the valve, in order to service the rotor or replace the seal ring.

In addition to reducing the time require for maintenance, if the body is installed in the upright position, there will be little or no loss of fluid during the servicing operation. This avoids a mess, and can be quite important where the fluid is expensive, or where the fluid contains harmful material that can contaminate the surrounding area, if spilled. The one-piece construction of the valve body also increases the strength of the valve, and permits its use in systems having a relatively high pressure.

The flow passages which communicate the open central portion and the low-pressure ports are located at one end of the open central portion of the valve body so that their entrances are in a single plane and the solid material surrounding each flow passage thus forms the seat for the rotor. The flow passages can have any desired cross-sectional shape, such as circular or square. However, in order to provide maximum flow area for the fluid flowing therethrough, it is preferable that the flow passages each have a cross-sectional shape in the form of a radial segment of a circle, so that the entire array of flow passages forms a complete circle. The seat portion of the valve body surrounding each flow passage thus resembles a spoked wagon wheel, and the unitary seal ring has a corresponding shape to seal against the rotor when it is seated thereagainst. In addition, the flow passages should have a cross-sectional shape that corresponds to the shape of the openings in the rotor at the seat and have a circular cross section corresponding to the connecting pipes at the ports. In this manner a constant or a gradually reducing cross-sectional flow area from the rotor to the connecting line can be maintained, thus resulting in a low differential pressure across the valve.

Both the high- and low-pressure ports can be of any convenient type suitable for the particular system, such as threaded or flanged. Similarly, the ports can be located in any desired position upon the valve body, provided that the high-pressure ports are always disposed on the upstream side of the seat and the low-pressure ports are disposed on the downstream side.

The valve body can be formed by machining, forging, casting or extruding. However, the unitary structure of the valve body renders it particularly well suited for manufacture by casting. It can thus be formed in the most compact manner having flow passages of optimum size and shape designed for maximum internal pressure and minimum differential pressure.

It can also be formed with a plurality of exterior bosses to provide alternative locations for the low-pressure ports. This greatly increases the versatility of the valve body by permitting its installation in many different piping systems.

The valve body can be constructed from any material that has the tensile strength to withstand the operating pressures of the system in which the valve is to be utilized. Plastic materials suitable for injection or compression molding are preferred for several reasons. By utilizing plastic materials, the cost of casting the valve body is kept to a minimum, inasmuch as the material itself is inexpensive, and usually requires little labor time for casting or molding. In addition, many plastic materials are resistant to deterioration by fluids, such as chlorinated water, which is a necessity for a multiport valve used in a swimming pool water circulation system, for example. Many plastic materials are also lightweight compared to metal, and thus permit the valve to be assembled and installed with relative ease. Many plastic materials especially when molded with smooth surfaces have low coefficients of friction, a factor which permits the rotor to turn within the valve body without the need for lubricants. Moreover, when pipes are threadably attached to the valve body, the plastic material can usually be deformed to perform the function of a seal to prevent external leakage, thus requiring no additional sealing means, such as gaskets, O-rings or tape.

Plastics such as ABS polymer, Celcon (polycarbonate resin), Cellon (cellulose acetate), Delrin (polyoxymethylene), nylon and Teflon (polytetrafluoroethylene) are particularly well suited for the formation of the valve body. Transparent or translucent plastic materials such as polyethylene, polypropylene, polyvinylchloride, and Lexan (polycarbonate resin) can also be employed. In systems where it is desirable to observe the clarity of the fluid at any given time, the use of a transparent valve body is advantageous.

Metallic materials can also be utilized for the construction of the valve body where additional strength is required, although they are less desirable than plastic. Suitable corrosion resistant metals that can be cast into the desired shape include aluminum, bronze, stainless steel, brass, zinc and cadmium-plated and zinc-plated iron, nickel and chromium, and ceramic-coated metals.

The valve rotor is a disc formed with at least one opening therethrough to conduct the high-pressure fluid from the open central portion of the valve body to the selected low-pressure port. The rotor is movably disposed within the open central portion of the valve body, so that it may be axially lifted from the valve seat and rotated to a position in which the opening is aligned with the flow passage in the valve body corresponding to the desired outlet port. In order to ensure proper alignment of the rotor upon the seat to avoid leakage and prevent excessive pressure drop, the cross-sectional shape of the opening in the valve rotor should be the same as the cross-sectional shape of the flow passages in the valve body. The seating surface of the rotor adjacent the valve seat is flat and smooth to provide a sealing surface for the seal ring in each position of the rotor.

The versatility of the multiport valve is greatly increased by providing an opening in the rotor to interconnect at least two flow passages in the valve body. By providing no communication between this opening and the open central portion of the valve body, the opening will only permit flow between various selected low-pressure ports. In this manner, high-pressure fluid can be directed from the inlet port via the rotor to a selected first low-pressure port from where it can flow to another component in the system, such as a filter. The effluent flow from the filter can then reenter the multiport valve through a second low-pressure port and be directed to a third low-pressure port by the opening formed within the rotor. The direction of flow within the filter can be reversed by moving the valve rotor to a position, in which the high-pressure inlet flow is directed to the second low-pressure port, which had previously been receiving effluent flow from the filter. In this position of the rotor, the reverse flow filter effluent can be returned to the valve via the first low-pressure port and can be directed to a fourth low-pressure port by the opening in the rotor. This is particularly useful for cleaning a filter by backwashing; a process wherein fluid is passed in the reverse direction through a filter to remove the contaminants that have been entrapped thereby. The multiport valve can return the clean filter effluent to the system via the third low-pressure port, in one position of the rotor, and can discharge the backwash effluent to a waste line via the fourth low-pressure port in another position of the rotor. In still another position of the rotor the filter effluent returning to the multiport valve via the second low-pressure port can be directed to the waste line via the fourth low-pressure port. This position is used to discharge residual backwash fluid remaining in the line immediately following the backwash operation to prevent its return to the system. In additional positions of the rotor, the system fluid can be discharged directly to the waste line or returned to the system without passing through the filter.

The rotor can be formed from the same material as the valve body. Plastic such as Celcon (polycarbonate resin) is particularly well adapted for this purpose, since it possesses high abrasion resistance for durability of the seal surface and has a low coefficient of friction for ease of rotation.

The unitary seal ring upon which the valve rotor seats is a feature of this invention which greatly improves the operating efficiency of the multiport valve. A continuous groove surrounding each flow passage is formed in the valve body. The groove can be formed by providing an insert which engages a step in the valve body, but for lower cost and high reliability a groove formed directly in the valve body is preferred. The unitary seal ring is designed to be disposed within this groove and be retained therein, to provide a seal between the rotor and the valve body in every position of the rotor. The seal ring is a molded one piece gasket of a resilient material having a raised sealing surface, which contacts the rotor in its seated position, and a dovetail portion which engages the groove in the valve body and seals therein when a biasing force is applied to the raised sealing surface.

It is desirable that a hard abrasion resistant material be utilized for the seal ring to ensure long life, and yet be able to obtain a fluidtight seal between the rotor and the raised sealing surface by applying a relatively low biasing force. This can be accomplished by forming the raised sealing surface so that it seals along a line, rather than a plane as in a flat gasket. For this purpose, the raised sealing surface should have a cross section in the form of a semicircle, triangle or any other geometric shape that permits thin line contact with the rotor. Since merely slight compression is required to effectuate a line seal, and the thickness of the raised sealing surface at the contact point with the rotor is necessarily thin to accomplish line sealing, it follows that the biasing force necessary to create a fluidtight seal is low. Therefore, a hard, abrasion resistant material can be employed for the seal ring to obtain a longer life, without the danger of leakage. Any resilient elastomer having high abrasion and erosion resistant properties and capable of being molded into the desired shapes can be utilized. Neoprene and polyurethane resin have been found to be particularly suitable. In this manner, the passage of sand and other hard particles across the seal ring surface when the valve is lifted for rotation to another position, which is common in swimming pool circulation systems, will usually not cause damage to the sealing surface that could result in leakage.

Inasmuch as relatively low biasing force upon the rotor is required to seat it in a fluidtight seal under normal conditions, if increased force is applied, the rotor can compress one portion of the raised sealing surface to a greater extent than another portion and still provide a fluidtight seal. Therefore, slight axial twisting of the rotor within the valve body will have not adverse affects. This allows the use of relatively loose dimensional tolerances upon the rotor and the seat, thus resulting in a lower manufacturing cost without sacrificing reliability. The raised portion also allows self-cleaning of the valve seat, since the fluid will usually sweep away any particles contained on the line seal when the rotor is raised for movement to another radial position.

The dovetail portion is formed by providing a V- or U-shaped groove on the side of the seal ring which faces the bottom of the groove in the valve body. The force of the rotor upon the raised portion biases the ring against the bottom of the groove, thus forcibly separating the dovetail legs into fluidtight contact with the bottom and/or the sides of the groove. The dovetail legs are quite flexible and therefore, the biasing force required to seal the rotor against the raised portion is sufficient to separate and compress the legs to form a fluidtight seal in the groove. Since the seal within the groove is provided by the separated legs, it is unnecessary to sealably bond the ring in place. Merely utilizing a flexible adhesive in various places along the ring to prevent the ring from being drawn from the groove by the flow, when the valve rotor is lifted therefrom for rotation, is sufficient. The ring can also be captured within the groove by overhanging lips formed on both sides of the groove. The lips retain the ring in the groove under adverse flow condition, yet permit compression of the ring to insure proper sealing. By forming the lips so that they overhang very slightly, the ring can be installed easily and removed for servicing. In addition, the ring can be formed with one or more triangular-shaped ribs which run along the entire periphery on both sides of the ring. The ribs are shaped such that they permit installation and compression of the ring within the groove, but tend to lock on sides of the groove when the ring is subjected to an upward force. The locking effect is strong enough to retain the ring within the groove during rotation of the rotor, but permits the ring to be easily removed for servicing.

The valve cover can have any shape suitable for enclosing pressure-containing vessels, such as hemispherical. The cover engages the valve body and is threadably secured or bolted in place to enclose the valve rotor therein, and prevent external leakage of fluid. A sealing ring, such as a gasket or an O-ring, is disposed between the valve body and the cover to provide a fluidtight seal. The cover is also provided with a bore which extends from the exterior to the open central portion of the valve body, and through which the valve handle can be operatively connected to the valve rotor. As is the case with the valve body and rotor, it is preferable to form the valve cover from plastic material, such as those listed above, in order to provide a lightweight, corrosion resistant unit.

The valve handle for manually moving the rotor to the desired rotational position can be a simple lever which is disposed at the exterior of the cover for both pivotal and rotational movement. A post fixedly mounted to the rotor can be provided to slidably engage the bore in the cover in a fluidtight seal and extend to the exterior of the multiport valve. The lever arm can be pivotally attached to the portion of the post extending outside of the cover to axially lift the rotor from the valve seat to allow rotational movement to the desired position, when the lever is either lifted or depressed. In the preferred embodiment the handle lever is of the depression type, since it is somewhat easier to operate. To accomplish this, the fulcrum of the lever handle is located between the attachment to the post and the free end of the handle. When the free end of the handle is depressed, it pivots about its fulcrum, thus axially lifting the post and the rotor from the valve seat. The handle can then be rotated about the post to the desired rotor position. Biasing means, such as a spring, is disposed between the cover and the rotor to force the rotor into a sealing position against the seat. This ensures that the rotor will return to a seating position upon release of the operating handle when there is insufficient inlet pressure to properly bias it. The spring also prevents the rotor from lifting due to a high back pressure when the inlet pressure is low.

The rotor is held in the selected valve position by providing a detent to engage the rotor or the post in each position, or by utilizing a key and slot arrangement to lock the handle in place. This can be simply a pin extending from the tip of the handle to engage a corresponding hole in the cover in each valve position. It can also be a plurality of radial slots formed on the exterior surface of the valve cover around the post, each corresponding to a different position of the rotor, to engage the tip of the valve handle in each selected rotary position of the valve. Locking the handle ensures that the valve will not rotate under severe flow conditions and prevents accidental turning, and also provides for the proper alignment of the rotor upon the seat.

To ensure high strength and durability, it is preferable to form the handle from metallic material. Metallic materials, such as brass, aluminum, and stainless steel, provide the necessary strength and corrosion resistance and can be employed. Similarly, since the post is pivotally attached to the handle, it too should be metallic, to prevent its excessive wear.

The multiport valve of this invention is particularly well suited for efficient control of fluid flow direction in swimming pool circulation systems, due to its lightweight, corrosion resistant construction, the unitary abrasion resistant seal ring, and the easily operable valve position-selecting means. In addition, the alternatively low-pressure port locations in the unitary valve body permit various piping schemes and thus simplify the mounting of the multiport valve within such a system. It should be noted, however, that the multiport valve is by no means limited to use only in swimming pool circulation systems and can be efficiently employed in any fluid system.

The construction and operation of the multiport valve of this invention are further explained by reference to the drawings in which.

Figure 3:
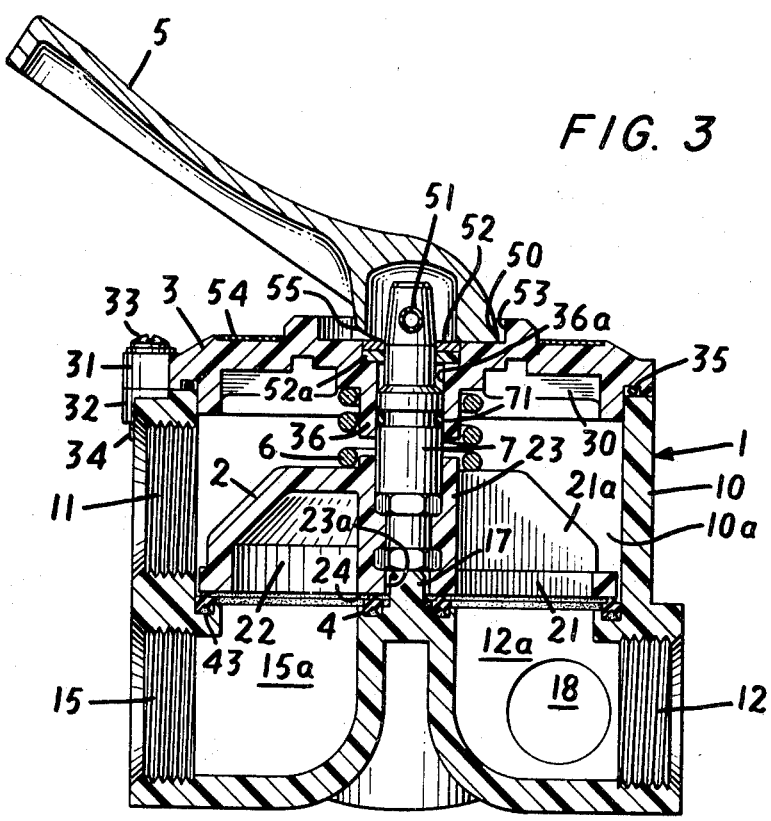
FIG. 3 is a cross-sectional view of the multiport valve taken along the line 3—3 of FIG. 1 and looking in the direction of the arrows.

The multiport valve shown in the drawings is primarily designed for use in a swimming pool circulation system and comprises a unitary injection molded valve body 1 formed of ABS (acrylonitrile-butadiene-styrene copolymer) plastic material and having a high-pressure inlet port 11 and four low-pressure inlet and outlet ports 12, 13, 14 and 15. As shown in FIG. 3, a valve rotor 2 is disposed within the valve body 1 between the line of flow from the high-pressure to the low-pressure ports for rotational and axial movement therein, to selectively direct fluid entering via inlet 11 to at least one low-pressure outlet port and to selectively interconnect at least two low-pressure ports. A handle 5 operatively connected to the rotor 2 by means of a post 7 allows manual selection of the desired valve position. A unitary seal ring 4 of high durometer neoprene (poly 2-chloro-1.3-butadiene) is disposed within the valve body 1 to provide a seat for the rotor 2 in order to prevent leakage across the rotor in each valve position. A cover 3 which sealably engages the valve body 1 encloses the rotor and prevents the external leakage of fluid from the interior of the multiport valve.

Figure 4:
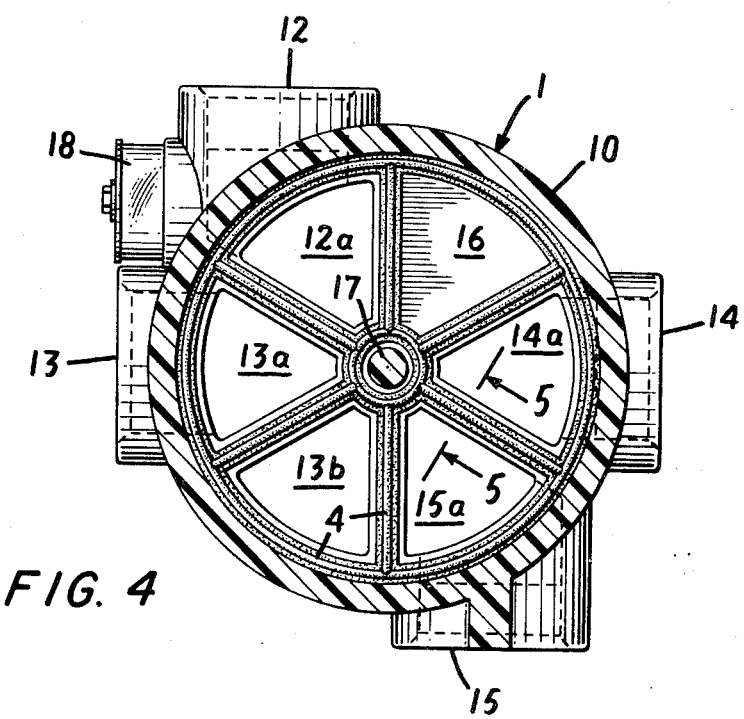
FIG. 4 is a cross-sectional view of the multiport valve showing the flow passages and a top view of the unitary seal ring, taken along the line 4—4 of FIG. 2 and looking in the direction of the arrows.

The valve body 1 has a cylindrical portion 10 having an open central portion 10a into which fluid from the high-pressure port 11 is conducted. The low-pressure ports 12, 13, 14, and 15 are formed beneath the cylindrical portion 10 of valve body 1 as tubular members and communicate with the internal chamber 10a via flow passages 12a, 13a, 14a and 15a, as shown in FIG. 4. In this manner, all low-pressure ports are located on the downstream side of the rotor 2 while the high-pressure inlet port 11 is located on the upstream side of the rotor 2. Therefore, the fluid entering via inlet port 11 need pass only once through the valve rotor 2 to be conducted to a selected outlet port, thereby ensuring a relatively low-pressure drop across the multiport valve. The pressure of the fluid entering through inlet port 11 also provides a force upon the upper face of the rotor 2, which biases the rotor in a sealing position against the seal ring 4.

Figure 1:
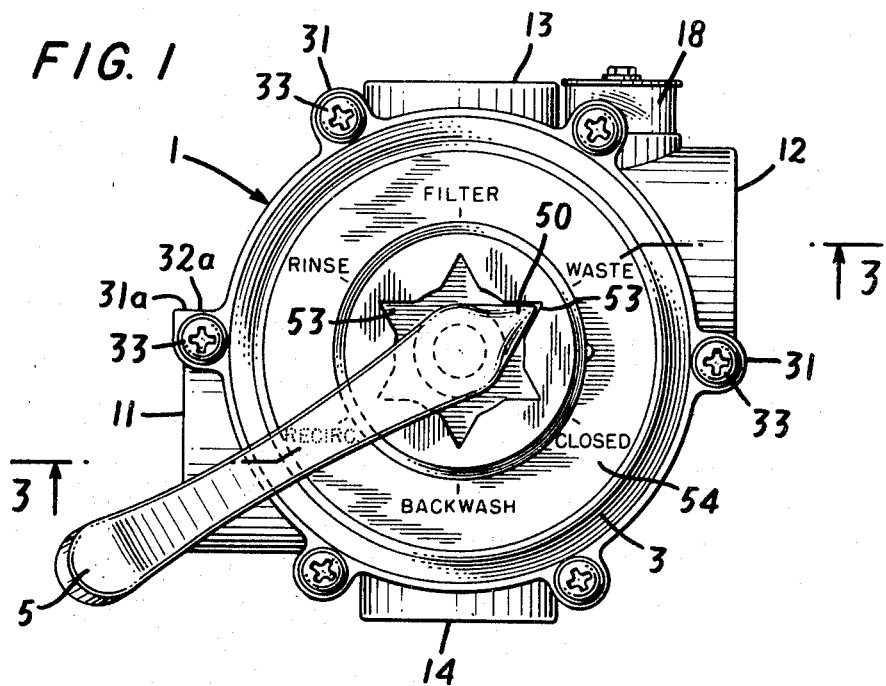
FIG. 1 is a top plan view of the multiport valve showing the valve handle and the means for securing it in the selected rotary position.

Flow passages 12a, 13a, 13b, 14a, 15a and 16 each correspond to a position of the rotor shown on selector plate 54 in FIG. 1. An opening 21 in the rotor 2 has the same cross-sectional shape as the flow passages 12a, 13a, 13b, 14a, 15a and 16. Therefore, in any position of the valve, the opening 21 will be aligned with a flow passage in the valve body so that the flow from the inlet 11 will pass through the opening 21 and be conducted to the selected outlet port.

Figure 5:
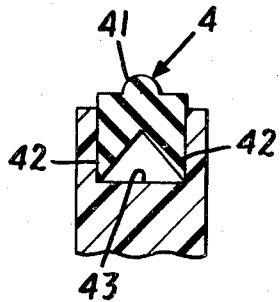
FIG. 5 is a cross-sectional view of the seal ring taken along the line 5—5 of FIG. 4 and looking in the direction of the arrows.

The unitary seal ring 4 is disposed within a groove 43 formed in the valve body 1 surrounding each flow passage. As shown in FIG. 5, the seal ring 4 has a raised portion 41, which provides the seat for the rotor 2 and a dovetail section 42 to form a fluidtight seal within the groove 43. When a biasing force is applied to the upstream side of the rotor 2, a smooth sealing surface 24 formed on the downstream side of the rotor, comes in contact with the raised portion 41 of the seal ring 4 to seat the rotor in the selected position. The force applied to the seal ring 4 by the rotor 2 causes the sides of the dovetail section 42 to spread when they contact the bottom of the groove 43, thus sealing against the sides of the groove 43. By forming the seal ring 4 from a high durometer resilient chlorine-resistant rubber, such as neoprene, it is resistant to abrasion by the rotor 2 and the flow of particulate material across the valve seat, which occurs when the rotor is lifted from its seating position for rotational movement, as well as resistant to deterioration by chlorinated water.

Figure 5A:
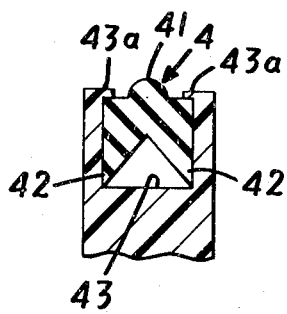
FIG. 5a is a cross-sectional view of the seal ring having alternative retaining means.

In FIG. 5a the groove 43 is formed having lips 43a at the entrance on both sides. The lips 43a prevent the seal ring 4 from being drawn out of the groove by the flow when the rotor is lifted from the seat, yet permit installation and compression of the ring 4 within the groove, and allow its removal for servicing or replacement. The lips 43a are sufficiently thin so that even over the wide compression range allowable only the raised sealing surface 41 will contact the rotor.

Figure 5B:
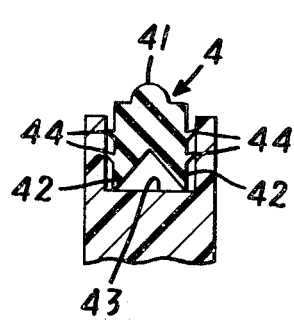
FIG. 5b is a cross-sectional view of another embodiment of the seal ring.

The seal ring shown in FIG. 5b is formed with triangular-shaped ribs 44 which extend along the entire periphery of the ring. The ribs 44 are shaped to permit installation and compression of the ring within the groove 43, but lock on the sides of the groove when subjected to an upward force to prevent the ring from being drawn out under adverse flow conditions. However, the locking force of the ribs does not prevent removal of the ring for servicing.

The rotor 2 is in the form of a disc having a central cylindrical hub 23 with a bore 23a located therein. A stud 17 formed at the center of the valve body 1 between the flow chambers slidably engages the bore 23a of the hub 23 to position and guide the rotor within the open central portion 10a. One portion of the rotor 2 is dome shaped and has a hollow chamber 22 formed therein to provide selective interconnection between at least two low-pressure ports. The purpose of this interconnection in a swimming pool water circulation system will be explained with reference to the schematic shown in FIG. 6. Two ribs 21a are formed in the rotor 2 to guide the flow into opening 21 and to provide structural support for the rotor 2 to enable it to withstand relatively high pressures. The rotor 2 is formed by injection molding Celcon plastic material. This material has high abrasion resistance and is particularly well suited for use as a valve seat. The sealing surface 24, therefore, is unlikely to be eroded or scratched during normal operation of the valve.

The cover 3 is a disc formed from ABS plastic material. Ribs 30 formed on the interior surface of the cover 3 provide strength for the cover to enable its used in a high-pressure system. Lugs 31 are formed along the outer periphery of the cover 3, so that the cover may be bolted to corresponding lugs 32 formed on the valve body 1. Bolts 33 and lock nuts 34 are used to secure the cover to the valve body. A seal ring 35 disposed between the cover 3 and the valve body 1 provides a fluidtight seal to prevent the external leakage of fluid. To simplify assembly of the cover 3 to the valve body 1, flat portions 31a and 32a as shown in FIG. 1 are formed on the sides of one pair of lugs 31 and 32. By matching the flat portion 31a to the flat portion 32a, the cover will automatically be in proper alignment with the valve body 1.

The cover is formed with a cylindrical hub portion 36 having an internal bore 36a. A brass post 7 mounted within the hub 23 of the rotor 2, slidably engages the bore 36a and extends to the exterior of the cover. An O-ring 71 disposed in a groove on the outer surface of the post 7 provides a fluidtight seal between the post 7 and the bore 36a. An aluminum valve handle 5 is pivotally attached to the exterior of the post 7 by pin 51. A fulcrum point 55 is provided for the handle 5, so that when the handle 5 is depressed, the post 7 will axially lift the rotor 2 from its seated position. A Teflon bearing 52a which requires no lubrication in a water system permits ease of rotation of the handle. A metallic bearing plate 52 provides the support for the fulcrum point 55 of the lever 5, thus preventing wear of the bearing 52a. A spring 6 is disposed between the cover 3 and the rotor 2 to bias the rotor 2 against the unitary seal ring 4 to prevent the rotor from lifting due to the back pressure within the swimming pool when the inlet pressure is low, and to return the handle 5 to its upright position after selection of a particular valve position has been made.

The central portion of the cover 3 adjacent to the handle 5 has a plurality of radial slots formed therein in the shape of a six-pointed star having points 53 each corresponding to a different position of the valve as shown in FIG. 1. A pointed section 50 is provided at the pinned end of the handle 5 to engage a point 53 and secure the rotor in each selected position of the valve.

Figure 2:
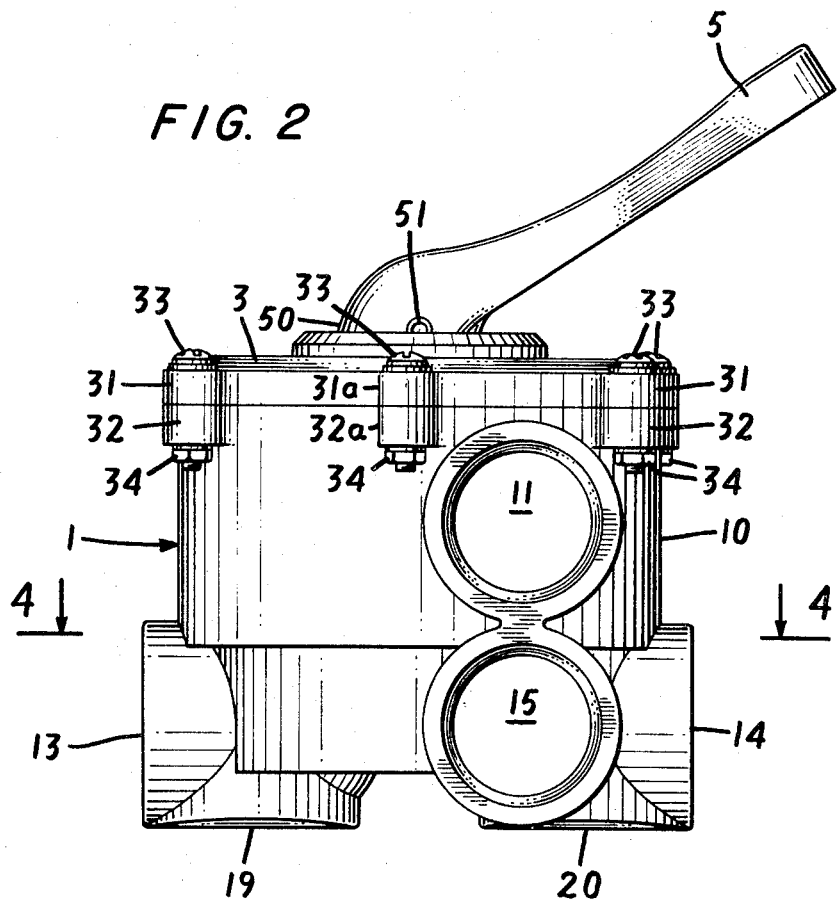
FIG. 2 is a side plan view of the multiport valve showing the position of several of the ports.

The molded construction of the valve body 1 permits variations in the locations of several different low-pressure ports without increasing the cost of production. As shown in FIG. 2, the flow passages in the valve body that communicate with ports 13 and 14 can be formed having additional exterior bosses for optional port locations 19 and 20. In this manner, a single casting design can be used for valves having different port locations, simply by machining the ports in the desired bosses, prior to assembly. This reduces production and storage costs by allowing one basic casting design to be used for several different multiport valves. In swimming pool circulation systems the alternative port locations permit top, side or offset mounting of the valve to a filter tank. This tends to simplify the required piping and can reduce the pressure loss within the system. In the valve shown, any one of four porting arrangements can be provided: 13 and 14, 19 and 20, 19 and 14, or 13 and 20.

The construction of the multiport valve body also simplifies maintenance servicing, and helps to maintain a low cost of operation. Since all of the ports are located in the valve body 1, the cover 3 may be removed for servicing without disconnecting any of the piping lines. In addition, the replacement of the cover upon the valve body can be rapidly accomplished without the danger of misaligning the rotor 2 upon the seal ring 4 by simply aligning the flat portions 31a and 32a of the lugs 31 and 32, prior to securing the cover 3 in place.

Figure 6:
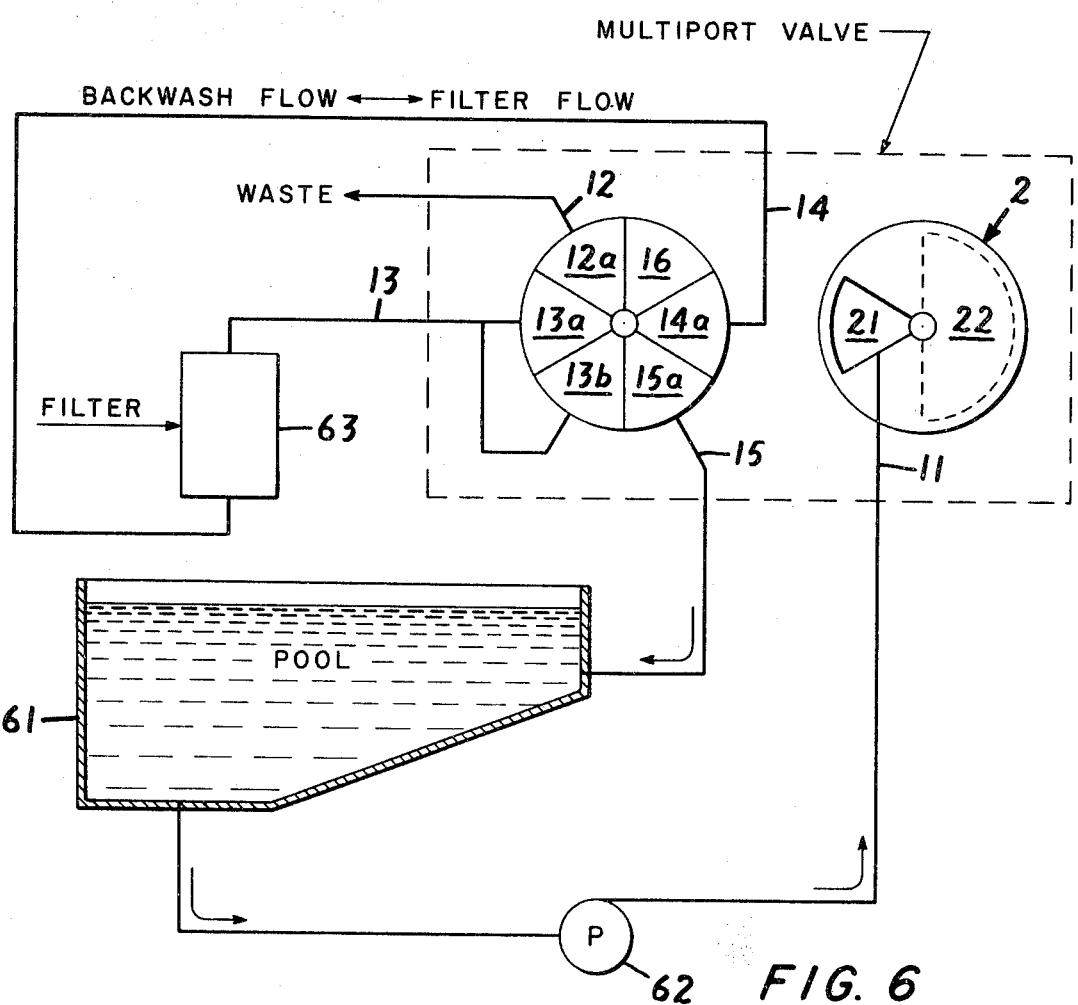
FIG. 6 is a flow schematic of a swimming pool circulation system.

In FIG. 6 a swimming pool 61 is shown schematically in fluid connection with a water-circulating system which comprises a pump 62, the multiport valve of this invention and a filter 63. The filter 63 is a tank-type filter utilizing sand or diatomaceous earth as the filter medium. Under normal filtering conditions flow from the pool is fed to the top of the filter where it passes through the sand. The contaminants contained in the water are removed, and the clean effluent is returned to the swimming pool. When the filter becomes dirty after continuous use, it is necessary to backwash the filter bed in order to remove the contaminants that have been trapped therein. This is accomplished by feeding the water from the pool in the reverse direction through the filter tank. The water is fed from the bottom of the tank and as it passes through the bed, it carries away with it the contaminants that had previously been trapped by the filter. The backwash effluent containing the contaminants is then discharged via a waste line.

The multiport valve of this invention can be used to direct the flow in any direction through the filter or to discharge waste effluent simply by moving the handle to the correction position. The multiport valve enclose by the dotted line in FIG. 6, is shown in the filter position in which the handle shown in FIG. 1 would be pointing toward the position marked "filter." In operation, water from the pool 61 is fed by pump 62 via inlet port 11 to the rotor 2. The fluid then passes through opening 21 and into flow passage 13a. The flow then proceeds via port 13 to the top of the filter tank 63. The filtered effluent passes from the bottom of filter tank 63 and is fed back to the multiport valve via port 14 and flow passage 14a. The fluid then passes through chamber 22 in the rotor 2 and is conducted to flow passage 15a and port 15 from where it is returned to the swimming pool 61. In this manner the chamber 22 of the rotor 2, is utilized to conduct flow between two low-pressure ports in the valve.

When the filter 63 becomes clogged, the valve handle 5 is depressed, thus lifting the rotor 2 from the seal ring 4. The handle is then turned to the position marked "backwash," as shown in FIG. 1 and is released, thus allowing spring 6 to bias the rotor 2 against the seat 4 in its new flow position. In the backwash position opening 21 of the rotor 2 is aligned with flow passage 14a of the valve body. Flow proceeds from the swimming pool 61 via the pump 62 and inlet port 11 to the multiport valve. It then passes through passages 21 and 14as from where it is conducted to outlet port 14 which connects to the bottom of the filter 63. The flow then proceeds upwardly through the filter 63 to remove the containants that have been trapped therein and is returned to the valve via port 13. In this position of the valve chamber 22 interconnects flow passages 13a, 13b and 12a. Therefore, the fluid that enters the valve via port 13 will be conducted via chamber 22 to flow passage 12a and will be discharged to a waste line via outlet port 12.

After backwashing of a swimming pool filter, waste effluent can be contained in the filter outlet line. Therefore, in order to prevent this fluid from reentering the swimming pool and contaminating it, prior to switching the valve back to the filter position, it is desirable to discharge a portion of the fluid contained in the filter outlet line. Thus can be accomplished with the multiport valve of this invention by moving the valve to the position marked "rinse," as shown in FIG. 1. In this position opening 21 of rotor 2 is disposed directly above flow passage 13b which connects to outlet port 13 and feeds fluid to the top of the filter. Chamber 22, on the other hand, interconnects flow passages 14a and 12a. Thus, the fluid which passes through the filter 63 and returns to the valve via port 14 will be exhausted to the waste line by passing from passage 14a through chamber 22 into passage 12a from where it will be discharged via port 12.

A sight gauge 18 is provided in flow passage 12a. When the valve is in the rinse or backwash position, it is desirable to observe the clarity of the waste fluid prior to returning the valve to the filter position. When the rinse fluid appears clean, the valve can then be switched to the filter position and normal circulation of the water from the pool through the filter can be accomplished.

At times, the filter must be serviced and for this purpose it may be necessary to disconnect it from the circulating system, or open it for viewing the filter bed. This can be accomplished without stopping the flow by moving the valve to the "recirculate" position. In this position, the fluid is conducted from inlet port 11 via opening 21 and flow passage 15a to port 15 from where it is returned directly to the pool without passing through the filter. Chamber 22 in this position interconnects flow passages 12a and 13a, but since there is no flow in these lines, no fluid will pass therebetween.

The multiport valve of this invention also allows water to be discharged directly from the swimming pool to a waste line without passing through the filter. This is accomplished by selecting the "waste" position of the valve, so that the pool water is directed via flow passage 12a to the waste line.

It is sometimes desirable to stop the flow in the system without stopping the pump. This is accomplished by switching the valve to the "closed" position. As shown, passage 16, which represents the closed position of the valve, does not connect to any outlet port. Therefore, when the rotor 2 is positioned so that opening 21 is directly above passage 16, the flow through the valve and throughout the system is stopped.

Having regard to the foregoing disclosure, the following is claimed as the inventive and patentable embodiments thereof.

1. A multiport valve for selectively directing fluid flow among a plurality of influent and effluent lines connected thereto, comprising a unitary valve body having an open central portion, at least one high-pressure inlet port in direct fluid communication with the open central portion, a plurality of low pressure ports, and an array of corresponding individual flow passages disposed at one end of the open central portion in fluid communication with the low pressure ports; a manually operable valve rotor in the form of a disc having at least one flow opening therethrough, and disposed for rotational movement within the open central portion of the valve body, between the line of flow from the high-pressure to the low-pressure ports and in close juxtaposition to the array of flow passages, to selectively direct the flow from the high pressure inlet port to at least one low-pressure port via a flow passage; and a unitary gasket disc having apertures therethrough located in positions corresponding to the flow openings in the rotor and the flow passages in the valve body for fluid flow connection therebetween in selected positions of the rotor, and formed of an abrasion resistant, resilient elastomer; for sealing the rotor in the selected positions, disposed within the valve body as a valve seat only between the rotor and the valve body surrounding the entry to each flow passage in the array to prevent leakage therebetween.

2. A multiport valve in accordance with claim 1, in which the rotor has a pressure-receiving surface on one side of the disc which is acted upon by the high-pressure flow from the high-pressure inlet port to bias the rotor into a seated position, and a seating surface sn the opposite side of the disc which contacts the unitary seal ring and forms a fluidtight seal therewith when the rotor is biased into a seated position by the high inlet pressure acting thereupon.

3. A multiport valve in accordance with claim 1, in which a removable valve cover is disposed in fluidtight engagement with the valve body to sealably enclose the open central portion thereof; said valve cover is removable without disconnecting any influent or effluent lines.

4. A multiport valve in accordance with claim 1, in which the unitary valve body is a casting molded from plastic material.

5. A multiport valve in accordance with claim 1, in which the unitary gasket for seating the rotor is disposed in a continuous groove surrounding each flow passage in the valve body.

6. A multiport valve in accordance with claim 5, in which the gasket has a raised sealing surface which contacts and is compressed by the rotor in its seated position in a line seal.

7. A multiport valve in accordance with claim 6, in which the gasket has a dovetail portion with flexible legs which are forcibly separated into fluidtight contact with the sides and/or bottom of the groove in the valve body when the raised sealing surface is compressed by the rotor.

8. A multiport valve in accordance with claim 7, in which the unitary gasket is secured within the groove by a flexible adhesive.

9. A multiport valve in accordance with claim 7, in which the groove is formed with a continuous overhanging lip on both sides to capture the unitary gasket therein.

10. A multiport valve in accordance with claim 7, in which the unitary gasket is formed having a plurality of triangular shaped ribs which extend along the entire periphery on both sides of the gasket; said ribs being adapted to permit installation and compression of the gasket within the groove when the gasket is subjected to a compressive force, and to lock on the sides of the groove when the gasket is subjected to an upward force.

11. A multiport valve in accordance with claim 8, in which the gasket is formed from Neoprene.

* * * * *